United States Patent
Xiao et al.

(10) Patent No.: US 9,141,384 B2
(45) Date of Patent: Sep. 22, 2015

(54) SYSTEM AND METHOD FOR ENFORCING APPLICATION ADOPTION

(75) Inventors: Hong Xiao, Acton, MA (US); Dongchen Wang, Concord, MA (US); Andre Turner, Belmont, MA (US); Changqing Wang, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 256 days.

(21) Appl. No.: 13/190,883

(22) Filed: Jul. 26, 2011

(65) Prior Publication Data

US 2013/0031159 A1    Jan. 31, 2013

(51) Int. Cl.
*G06F 15/16* (2006.01)
*G06F 9/44* (2006.01)

(52) U.S. Cl.
CPC .......................................... *G06F 8/76* (2013.01)

(58) Field of Classification Search
CPC ....................................................... G06F 8/76
See application file for complete search history.

(56) References Cited

U.S. PATENT DOCUMENTS

| | | | |
|---|---|---|---|
| 7,739,620 B1* | 6/2010 | Kong et al. | 715/810 |
| 2001/0017632 A1* | 8/2001 | Goren-Bar | 345/744 |
| 2003/0229890 A1* | 12/2003 | Lau et al. | 717/168 |
| 2004/0255290 A1* | 12/2004 | Bates et al. | 717/174 |
| 2006/0026012 A1* | 2/2006 | Campbell | 705/1 |
| 2007/0016616 A1* | 1/2007 | Brill et al. | 707/104.1 |
| 2008/0126375 A1* | 5/2008 | Sattler et al. | 707/101 |
| 2009/0300137 A1* | 12/2009 | Tyhurst et al. | 709/217 |
| 2010/0125657 A1* | 5/2010 | Dowling et al. | 709/224 |
| 2010/0132018 A1* | 5/2010 | Takala et al. | 726/5 |
| 2012/0036166 A1* | 2/2012 | Qiu et al. | 707/803 |
| 2012/0110463 A1* | 5/2012 | Brolley et al. | 715/738 |
| 2012/0131566 A1* | 5/2012 | Morgan et al. | 717/170 |
| 2013/0019007 A1* | 1/2013 | Mukunthu | 709/224 |

* cited by examiner

*Primary Examiner* — Brian J Gillis
*Assistant Examiner* — Juan C Turriate Gastulo

(57) ABSTRACT

A method includes determining that a legacy application is executing on a client device. When the legacy application is open in the client device, an adoption rule is applied, wherein the adoption rule defines an instance in which a user is required to use a replacement application instead of the legacy application. When it is determined that the adoption rule is satisfied, the replacement application is executed and use of the legacy application is prevented.

19 Claims, 7 Drawing Sheets

| | LEGACY ID | REPLACEMENT ID | TRIGGER | ACTION |
|---|---|---|---|---|
| 405-1 | CRMPro v3.25 | ResourceTools v1.4 | User never used replacement app | Display alert about the replacement app |
| 405-2 | CRMPro v3.25 | ResourceTools v1.4 | User has not used replacement app for two weeks + currently weekend | Block legacy app and enforce replacement app |
| 405-3 | CRMPro v3.25 | ResourceTools v1.4 | User used replacement app during weekend for two weeks + mistake count < 10 + currently weekend or Friday | Block legacy app and enforce replacement app |
| 405-4 | CRMPro v3.25 | ResourceTools v1.4 | User used replacement app during weekend for two weeks + mistake count < 8 + currently weekend or Friday or Tuesday | Block legacy app and enforce replacement app |
| 405-5 | CRMPro v3.25 | ResourceTools v1.4 | User used replacement app during weekend for two weeks + mistake count < 6 + currently weekend or Friday or Tuesday or Thursday | Block legacy app and enforce replacement app |
| 405-6 | CRMPro v3.25 | ResourceTools v1.4 | User used replacement app during weekend for two weeks + mistake count < 4 + currently weekend or Friday or Tuesday or Thursday or Wednesday | Block legacy app and enforce replacement app |
| 405-7 | CRMPro v3.25 | ResourceTools v1.4 | User used replacement app during weekend for two weeks + mistake count < 2 | Block legacy app and enforce replacement app |
| 405-8 | CRMPro v3.25 | ResourceTools v1.4 | User used replacement app for two months + mistake count < 1 + used help < 3 | Shutdown legacy app |
| 405-9 | CRMPro v3.25 | ResourceTools v1.4 | User used replacement app for three months + mistake count < 1 + used help < 1 | Shutdown legacy app + Remove legacy app |

FIG. 4

SYSTEM AND METHOD FOR ENFORCING APPLICATION ADOPTION

BACKGROUND

Converting software applications in an enterprise setting can be a very costly and disruptive endeavor. Typically, companies must invest significant time and resources in training their staff to use the new applications. In addition, rapid switchover from a legacy application to a new application can result in significant lost productivity, while the employees learn the new system.

In some instances, enterprises allow users to use both applications for a prolonged period of time, thereby increasing productivity. However, the availability of a comfortable, known alternative often retards the time taken to learn the new system or application

BRIEF DESCRIPTION OF THE DRAWINGS

FIG. 4 is an exemplary adoption rules table;

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments disclosed herein.

Consistent with implementations described herein, an upgraded or updated application adoption system may be provided that enforces an application upgrade path based user usage statistics and other heuristics. For example, an adoption enforcement application executing on a workstation may monitor a user's behavior with respect to a particular application. Characteristics of the monitored behavior may be compared to a number of adoption enforcement rules to identify appropriate adoption support measures. Exemplary adoption support measures could include forced execution of the updated application, tutorial execution, help screens, reminders, notifications to managers, time limitations for execution or removal of the old (e.g., non-updated application), etc.

Figure 1:
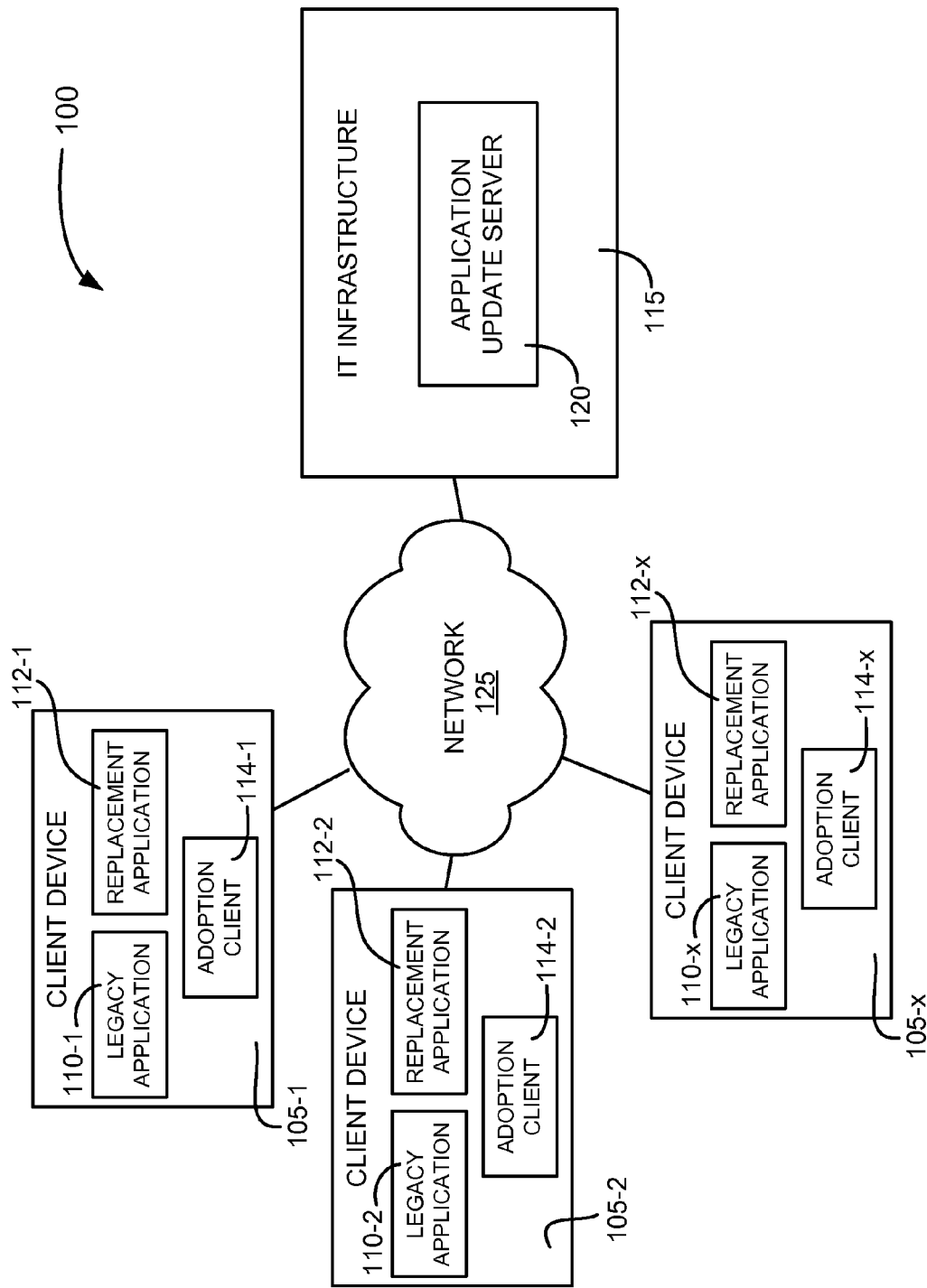
FIG. 1 illustrates a block diagram of an exemplary environment in which systems and methods described herein may be implemented.

FIG. 1 is a block diagram of an exemplary environment 100 in which systems and methods described herein may be implemented. As shown, environment 100 may include a number of client devices 105-1, 105-2, and 105-x (collectively "client devices 105" and individually "client device 105") connected to network 125, either directly, or indirectly. Environment 100 may also include an information technology (IT) infrastructure 110.

Consistent with embodiments described herein, client devices 105 may include any suitable computing device capable of executing an application, such as desktop computers, laptop or notebook computers, tablet computers, workstations, smartphones, etc., or any device capable of initiating, transmitting, and receiving data communications via network 125. It should be understood that although environment 100 includes three client devices 105, in practice, a typical system may include any number and type of client devices 105.

As shown schematically in FIG. 1, client devices 105 may include a legacy application 110, a replacement (or upgraded/updated) application 112, and an adoption client 114 executing thereon (among other devices and components). Legacy application 110 may include any type of software application, program, plugin, etc. that is being transitioned to replacement application 112. For example, legacy application 110 may include an customer resource management (CRM) application that is being phased out in favor of a new CRM application 112. Consistent with implementations described herein, both legacy application 110 and replacement application 112 may be resident and executable on client device 105 during the transition or adoption period.

As described in detail below, adoption client 114 may be a transparent application or process configured to monitor a user's usage of replacement application 112 and legacy application 110. In some embodiments, adoption client 114 may be configured to execute a number of adoption rules based on, for example, input or information received from users, such as keystroke input, commands, user interactions, duration of use, etc. to enforce a transition or adoption program associated with replacement application 112. In addition, adoption client 114 may communicate information relating to usage of replacement application 112 and legacy application 114 to IT infrastructure 115 via network 125.

IT infrastructure 115 may include one or more devices configured to facilitate management of client devices 105 and applications or systems executable by or available to client devices 105. For example, in one implementation, IT infrastructure 115 may include devices associated with an enterprise IT department, such as remote management workstations, server devices, printers, etc.

As shown schematically in FIG. 1, in some implementations, IT infrastructure 115 may include an application update server 120 (among other devices and components). Application update server 120 may include any device or combination of devices configured to support systematic and enterprise-level updating or replacement of applications or software programs resident or executing on client devices 105. For example, application update server 120 may be configured to communicate with adoption clients 114 on client devices 105 to enforce enterprise-wide adoption policies.

In some embodiments, application update server 120 may be configured to distribute updated or replacement application 112 (or plugins, patches, add-ons, extensions, etc.). Application update server 120 may be further configured to distribute an initial set of adoption rules to adoption clients 114. As described above, the adoption rules may indicate how and when adoption enforcement and/or assistance is provided to users. Application update server 120 may receive data from adoption clients 114 indicative of an adoption effectiveness across the enterprise (e.g., across all client devices 105). Based on this data, application update server 120 may heuristically update the adoption rules and may re-distribute the updated adoption rules to adoption clients 100. The approach to adoption rules may provide a more effective and efficient update transition with the lowest amount of lost time and productivity.

Network 125 may include any packet-based network capable of permitting devices 105-115 to communicate with each other. For example, network 125 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

The exemplary configuration illustrated in FIG. 1 is provided for simplicity. It should be understood that a typical network may include more or fewer devices or entities than those illustrated in FIG. 1. For example, other devices that facilitate communications between the various entities illustrated in FIG. 1 may also be included in environment 100.

The environment described in FIG. 1 is over-simplified for the purposes of brevity and may include any number of client devices 105, networks 125, or infrastructure devices 115. In addition, environment 100 may include other devices not depicted in FIG. 1. In some embodiments, the functionality of application update server 120 and/or adoption clients 110 may be implemented in other devices, such as a particular client device 105 (e.g., a desktop computer, laptop, or client device, such as a router, gateway or switch). Additional details regarding the operation of application update server 120 and adoption clients 110 are set forth in additional detail below.

Figure 2:
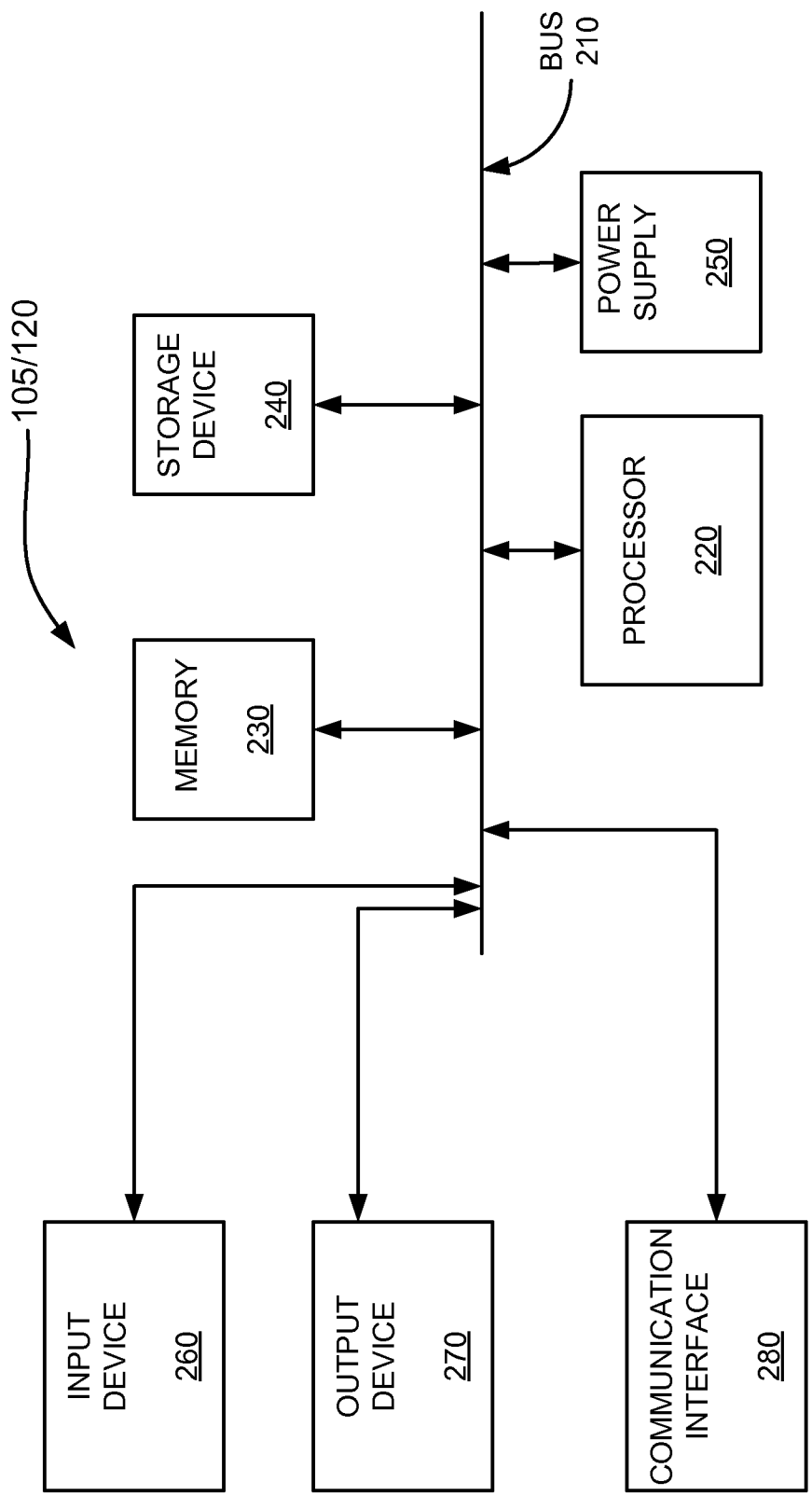
FIG. 2 is a diagram illustrating exemplary components of an exemplary device of FIG. 1.

FIG. 2 is a diagram illustrating components of an exemplary client device 105 or application update server 120. Referring to FIG. 2, device 105/120 (e.g., desktop computer, workstation, server, etc.) may include bus 210, processor 220, memory 230, storage device 240, power supply 250, input device 260, output device 270, and communication interface 280. Device 105/120 may be configured in a number of additional ways and may include other or different elements. For example, device 105/120 may include one or more interfaces, modulators, demodulators, encoders, decoders, etc., for processing data.

Bus 210 may include a path that permits communication among the elements of device 105/115. Processor 220 may include one or more processors, microprocessors, application specific integrated circuits (ASICs), field programmable gate arrays (FPGAs), or other processing logic that may interpret and execute instructions. Memory 230 may include a random access memory (RAM) or another type of dynamic or static (e.g., read only memory (ROM)) storage device that may store information and instructions for execution by processor 220. Storage device 240 may include a magnetic and/or optical recording medium and its corresponding drive. Power supply 250 may include a battery or other power source powering service provider 120.

Input device 260 may permit a user to input information to client device 105, such as a camera, a sensor (e.g., a motion detector), microphone, a keypad, a keyboard, a touch screen, a mouse, a pen, etc. Output device 270 may output information to the user, such as a display, a printer, one or more speakers, etc.

Communication interface 280 may include a transceiver that enables device 105/120 to communicate with other devices and/or systems, such as other client devices 105 and/or IT infrastructure 115. For example, communication interface 280 may include interfaces, such as a modem or Ethernet interface, for communicating via a network, such as network 120.

In implementations consistent with embodiments described herein, device 105/120 may perform processing associated with implementing and enforcing application update or replacement adoption. Device 105/120 may perform these operations in response to processor 220 executing sequences of instructions contained in a computer-readable medium, such as memory 230. A computer-readable medium may include a physical or logical memory device. The software instructions may be read into memory 230 from another computer-readable medium, such as data storage device 240, or from another device via communication interface 280. The software instructions contained in memory 230 may cause processor 220 to perform processes that are described below. Alternatively, hard-wired circuitry may be used in place of or in combination with software instructions to implement processes consistent with the embodiments described herein. Thus, implementations described herein are not limited to any specific combination of hardware circuitry and software. For the purposes of this application, a "computer" may be defined as a device, or combination of devices, that performs high-speed mathematical or logical operations, or that assembles, stores, correlates, or otherwise processes information.

Figure 3:
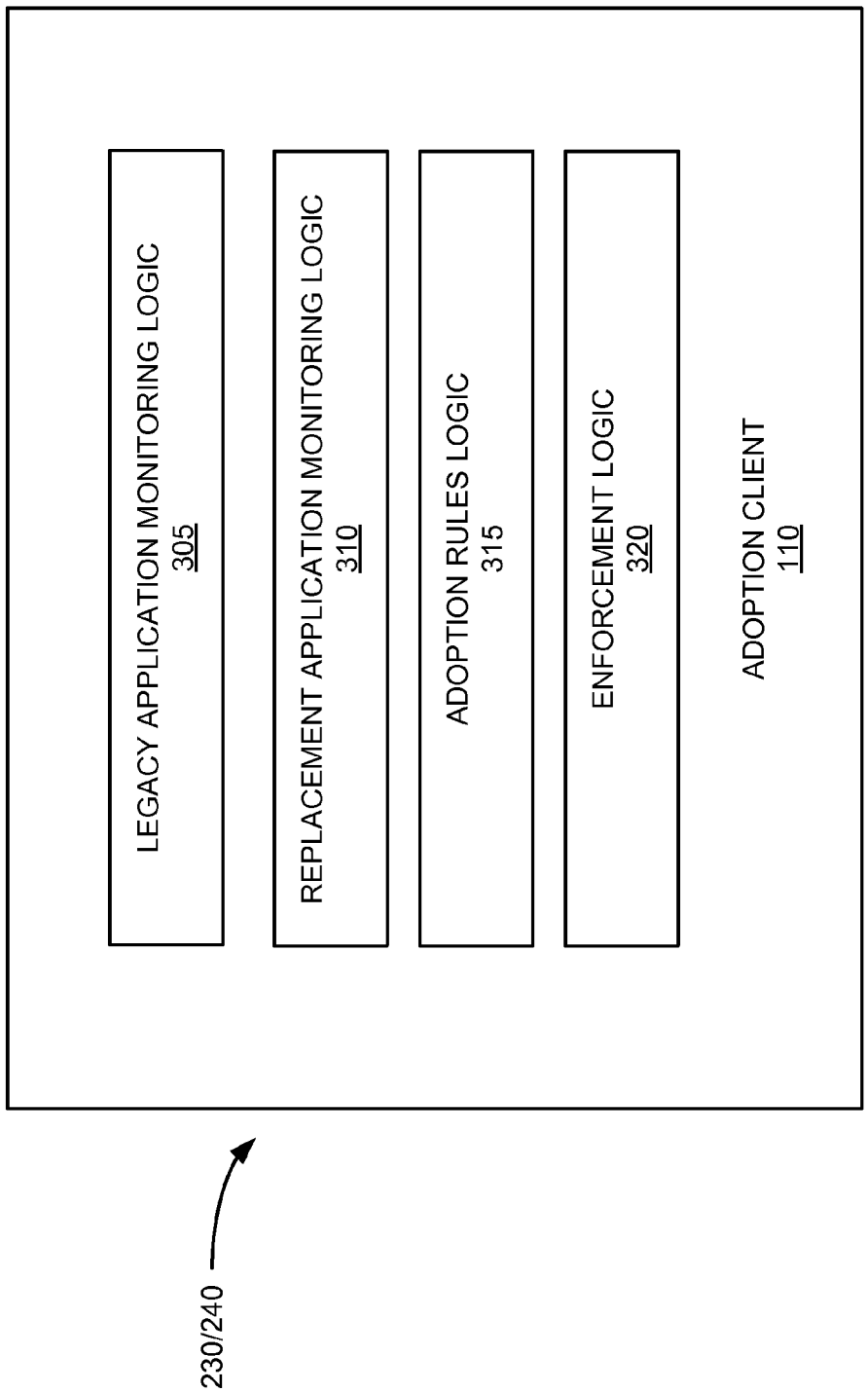
FIG. 3 is a functional block diagram of exemplary components implemented in the adoption client of FIG. 1.

FIG. 3 is a functional block diagram of exemplary components implemented in adoption client 114 of FIG. 1. The logical blocks illustrated in FIG. 3 may be implemented in software, hardware, a combination of hardware and software. In alternative implementations, some or all of the components illustrated in FIG. 3 may be implemented in other devices or combinations of devices, such as application update server 115, and/or other devices (e.g., servers, switches, gateways, etc.). Referring to FIG. 3, memory 230 may include legacy application monitoring logic 305, replacement application monitoring logic 310, adoption rules logic 315, and enforcement logic 320. Various logic components illustrated in FIG. 3 may be implemented by processor 220 executing one or more programs stored in memory 230. In some implementations, one or more components of FIG. 3 may be implemented in other devices associated with client device 105, such as database or other structures.

Legacy application monitoring logic 305 may include software or a combination of hardware and software configured to monitor user interactions with an original or legacy application 110 (e.g., the software application to be upgraded, updated, or replaced). As described briefly above, in some instances, it may be desirable and more efficient to enable users to transition from legacy application 110 to replacement application 112 over a period of time. This allows the user to perform their function to a desired level, while simultaneously building familiarity with the new software.

For example, legacy application monitoring logic 305 may be configured to monitor whether legacy application 110 is running and the length of time that a user uses legacy application 110. This time may be measured in absolute time (e.g. application running for x hours on mm/dd/yyyy) or in terms of active user engagement. Discerning user engagement may be based on a number of factors, such as determining whether legacy application 110 is running in an "active" window on a client device 105, whether legacy application 110 is receiving affirmative user interactions (e.g., clicks, data entry, etc.). In other instances, replacement application usage time may be calculated relative to legacy application usage time.

Replacement application monitoring logic 310 include software or a combination of hardware and software configured to monitor user interactions with replacement or upgraded application 112. For example, similar to legacy application monitoring logic 305, replacement application monitoring logic 310 may monitor an execution state of replacement application 112 and the amount of time that the user interacts with replacement application 112.

In addition, replacement application monitoring logic 310 may be configured to monitor interaction with replacement application 112 in a more granular manner. For example, replacement application monitoring logic 310 may monitor keystrokes or input received in replacement application 112 and may determine an accuracy or efficiency of the interactions based on the features of replacement application 112 being used.

In one implementation, legacy application monitoring logic 305 and/or replacement application monitoring logic 310 may identify executing or open applications by calling retrieving a list of all windows currently running or executing on client device 105. The text of any open windows may be retrieved and the text compared to identifiers associated with legacy application 110 and replacement application 112 to determine the execution state of each application. For example, in a Microsoft Windows® environment, application programming interfaces (APIs) for EnumWindows (to retrieve list of currently running windows), GetWindowHandler (to open the window handler), and SendMessage with parameter wm_gettext (to extract the text from each window caption.

For individual user interactions, replacement application monitoring logic 310 may be configured to identify user controls present in a particular window or application interface screen and to retrieve the content of the available controls. User selections of particular controls may then be determined and used as a basis for triggering various adoption actions, as described in addition detail below. For example, in a Microsoft Windows environment, a GetChildWindow API may be implemented to retrieve a list of user controls in a window and the SendMessage with parameter wm_gettext may be used to extract the text from each user control.

In addition, replacement application monitoring logic 310 may be configured to use a dynamic link library (DLL) to install a hook function into client device 105 to intercept all and handle all The keystrokes received in replacement application 112. The received keystrokes can be used (alone, or in combination with other elements, such as user control identification information) to trigger adoption client actions.

Replacement application monitoring logic 310 may be further configured to generate or compile statistics (also referred to as logs) regarding user interactions with replacement application 112, such as accuracy statistics, usage time statistics, etc. The generated statistics may be periodically transmitted to application update server 120 for use in adjusting the adoption rules or providing addition assistance to users via changes to replacement application 112 or adoption client 114.

As described below, the determined statistics may also be used by enforcement logic 320 to provide appropriate feedback and based on a number of adoption rules received from application update server 120 and stored in adoption rules logic 315. More specifically, the adoption rules received from application update server 120 may dictate responses to information determined by legacy application monitoring logic 305 and replacement application monitoring logic 310 implemented by enforcement logic 320. In some instances, adoption rules may be segmented based on a number of adoption stages, indicating a phase in a user's transition from legacy application 110 to replacement application 112. For example, first phase adoption rules may be applied upon initial installation of replacement application 112 and may be used until the user demonstrates a predetermined level of proficiency at using replacement application 112, as identified via a predetermined accuracy level in replacement application monitoring logic 310. Subsequent to the user demonstrating the predetermined level of proficiency, second phase adoption rules may be applied, etc.

FIG. 4 is an exemplary adoption rules table 400. As shown, adoption rules table 400 may include a number of entries 405-1 to 405-*x* (collectively referred to as "entries 405" and individually as "entry 405"). Each entry 405 (also referred to as rule 405) in adoption rules table 400 may correspond to a particular adoption rule for application by adoption client 114 for a particular replacement application 112. In an exemplary embodiment, each entry 405 may include a legacy application identifier field 410, a replacement application identifier field 415, a trigger field 420, and an action field 425.

Legacy application identifier field 410 may include a value representing the legacy application 110 to which the rule applies. For example, entry 405-1 indicates a legacy application identifier of CRMPro v3.25. Although entry 405-1 designates an identified legacy application identifier that corresponds to an actual application name and version, in other implementations, the value provided in legacy application identifier field 410 may include a different identifier that corresponds to the particular application. For example, a value of 13546 may be associated with CRMPro v3.25.

Replacement application identifier field 415 may include a value representing the replacement application 112 to which the rule applies. For example, entry 410-1 indicates a replacement application identifier of ResourceTools v1.4.

Trigger field 420 may include a value indicative of the event or statistic that causes execution of the action designated in action field 425. Exemplary trigger field values may include time-based triggers, activity-based triggers, statistics-based triggers, or combinations thereof Time-based triggers may identify expiration of particular time periods, such as "legacy time exceeds two successive hours," "time since last reminder is 60 minutes," legacy time exceeds two hours in last eight hours," etc. Activity-based triggers may identified monitored activities, such as "legacy opened," "incorrect command on screen 1234," "legacy keystrokes detected," etc. Statistics-based triggers may identify statistical elements determined by replacement application monitoring application 310, such as error rates, etc., such as "50%>error rate>25%," indicating that the generated error rate is between 25 and 50%, "25%>error rate>15%," etc. Compound or combination triggers may include time-related elements and statistics related elements. For example, a compound trigger may include a time component, such as that the user has used the replacement application during weekends for the past two weeks, and an accuracy component, such as that the user's mistake count (during their most recent use) is less than 10. Additional exemplary triggers are illustrated in rules table 400.

Action field 425 may include a value indicative of an action to be performed by adoption client 114 upon satisfaction of the particular rule. Exemplary actions may include reminder display; data translation (e.g., copy from legacy application 114 to replacement application 112); assistance offering (e.g., help screens, tutorials); forced use of replacement application 112 (e.g., by closing legacy application 110), etc. In some implementations, multiple actions may be executed upon satisfaction of a particular rule, action field 425 may indicate that 1) current data from legacy application 110 is copied; 2) an element of replacement application 112 corresponding to the current element of legacy application 110 (e.g., an order placement screen) is opened; 3) and copied data is inserted into replacement application 112. In addition, in some embodiments, actions may be executed upon satisfaction of additional criteria, such as time of day, day of week, etc. In some instances, additional actions relating to instructing the user regarding what has occurred and what the next step is may be provided, such as via pop-ups, tool-tips, overlays, etc. In an event, each action may be established based on action field entries in rules database 400.

Returning to FIG. 3, enforcement logic 320 may include software or a combination of hardware and software configured to execute actions identified in satisfied adoption rules 405. For example, using rule 405-1 as an example, upon opening or startup (as identified in trigger field 420 of rule 405-1) of legacy application 110 (as identified in legacy application field 410 of rule 405-1), enforcement logic 320 may retrieve cause client device 105 to display a reminder indicating that replacement application 114 is available as an update to legacy application 112. The action is based on the action identifier from action field 425 in rule 405-1. Based on the applicable action identifier, different actions may be performed. In this manner, adoption of replacement application and the enforcement mechanisms implemented based on a particular user's actions.

Figure 5:
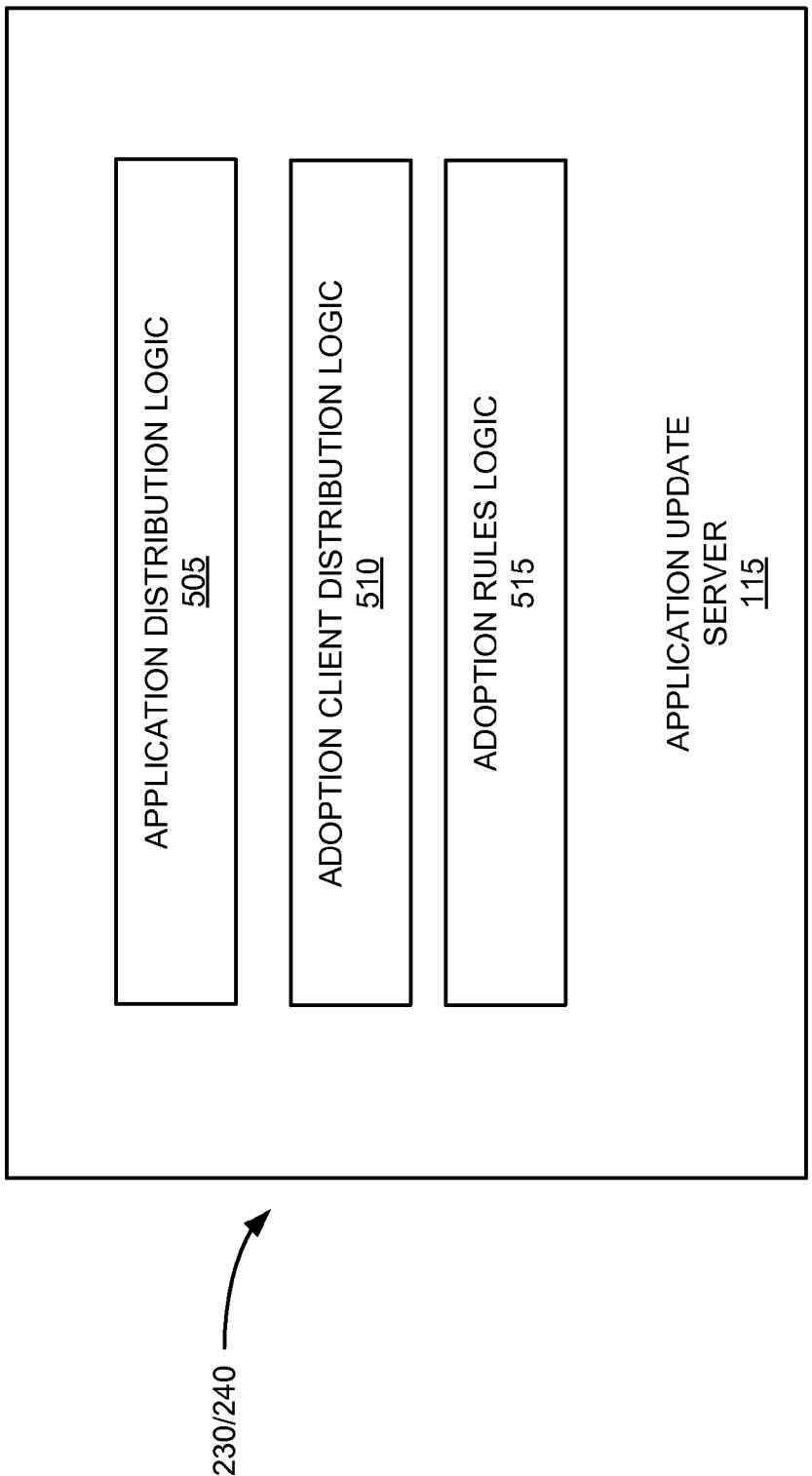
FIG. 5 is a functional block diagram of exemplary components implemented in application update server of FIG. 1.

FIG. 5 is a functional block diagram of exemplary components implemented in application update server 120 of FIG. 1. The logical blocks illustrated in FIG. 5 may be implemented in software, hardware, a combination of hardware and software. In alternative implementations, some or all of the components illustrated in FIG. 5 may be implemented in other devices or combinations of devices, such as other servers, switches, gateways, etc.). Referring to FIG. 5, memory 230 may include application distribution logic 505, adoption client distribution logic 510, and adoption rules logic 515. Various logic components illustrated in FIG. 5 may be implemented by processor 220 executing one or more programs stored in memory 230. In some implementations, one or more components of FIG. 5 may be implemented in other devices associated with IT infrastructure 115, such as database or other structures.

Application distribution logic 505 may include software or a combination of hardware and software configured to distribute or deploy an application from IT infrastructure 115 to client devices 105 via network 125. For example, application distribution logic 505 may include systems for deploying replacement application 112 to client devices 105. In some instances, application distribution logic 505 may be configured to determine application requirements, such as libraries, related or dependent applications, etc. and may simultaneously distribute any such requirements to client devices 105.

Adoption client distribution logic 510 may include software or a combination of hardware and software configured to distribute or deploy adoption client 114 to client devices 105. As described above, adoption client 114 may include logic to monitor a user's usage of legacy application 110 and replacement application 112 and apply adoption rules based on the monitored usage, eventually requiring a user to fully transition from legacy application 110 to replacement application 110. Similar to application distribution logic 505, adoption client distribution logic may be configured to transmit and install adoption client 114 on client devices 105.

Consistent with implementations described herein, adoption client distribution logic 510 may be configured to provide a number of adoption rules within adoption client 114 for distribution to client devices 105. As described above, the adoption rules may designate the legacy and replacement applications, elements that trigger actions based on the rules, and enforcement actions for execution by adoption client 114. In some embodiments, adoption rules may be updated based on unilateral policy changes (e.g., by management, etc.), or based on statistics and data received from adoption clients 114 regarding accuracy, usage, etc. Adoption client distribution logic 510 may distribute the updated or modified adoption rules to client devices 105 within updated versions of adoption client 114, or via rules or rule definition updates to existing installations of adoption clients 114.

Adoption rules logic 515 may include software or a combination of hardware and software configured to maintain and update adoption rules (e.g., rule table 400). For example, an initial rule set may be configured or established upon initial deployment of replacement application 112 to client devices 105. During the transition period, adoption rules logic 515 may receive usage statistics from adoption client 114 (e.g., from replacement application monitoring logic 310) for each user device 105 in network 100. Based on the received statistics and/or other data, adoption rules logic 515 may be configured to heuristically update the adoption rules to maximize the effectiveness and productivity of the users throughout the transition. For example, time-based rules may be decelerated or accelerated (e.g., forced adoption times may be increased or reduced), help/tutorial text or helper actions may be updated, etc.

Figure 6:
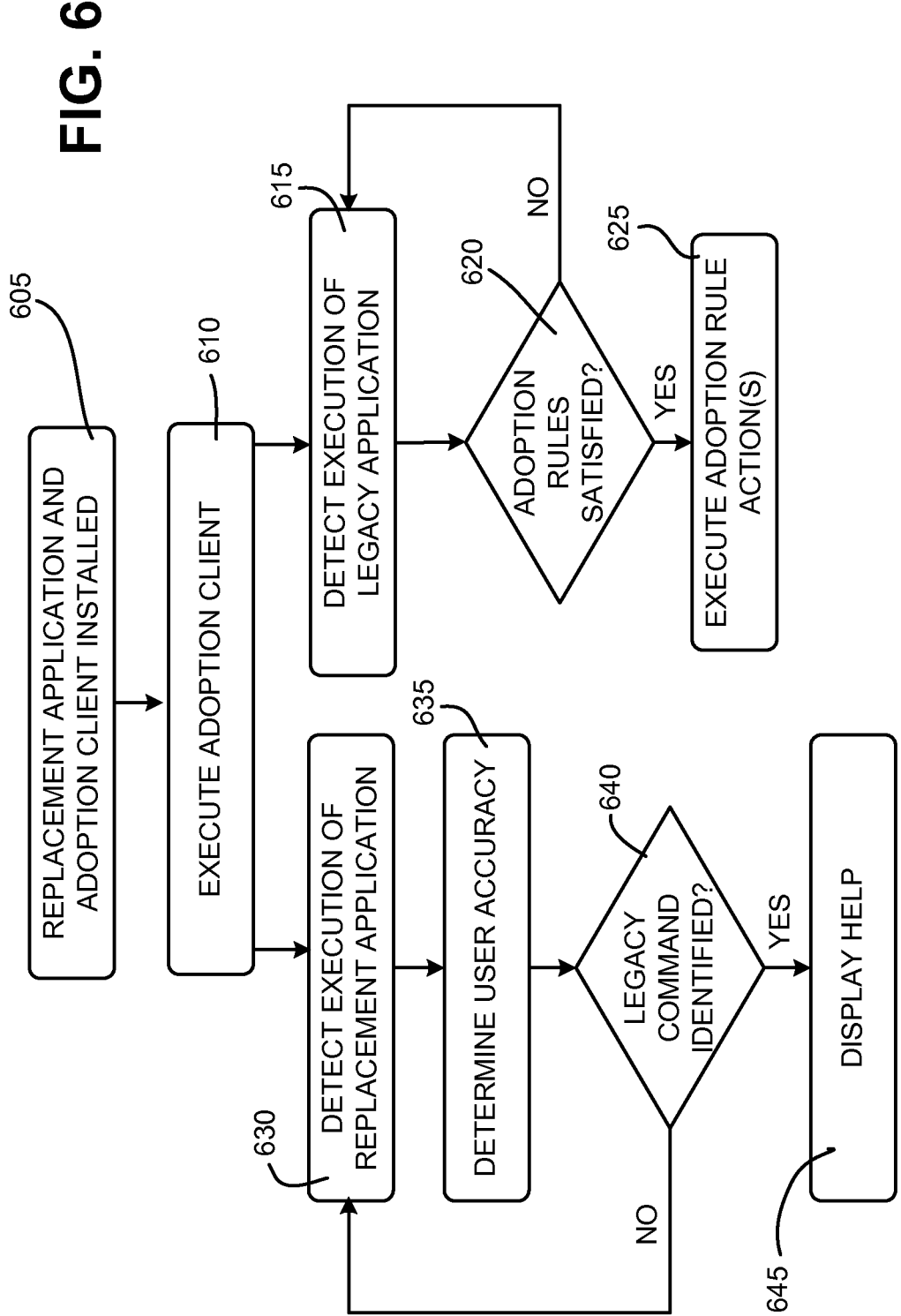
FIG. 6 is a flow diagram illustrating exemplary processing associated with providing enforcing adoption of the replacement application of FIG. 1 in a manner consistent with embodiments described herein.

FIG. 6 is a flow diagram illustrating exemplary processing associated with providing enforcing adoption of replacement application 112 in network 100 consistent with embodiments described herein. Processing may begin with replacement application 112 and adoption client 114 being installed on a client device 105 (block 605). For example, application update server 120 may deploy or otherwise cause replacement application 112 and adoption client 114 to be installed on each client device 105 in network 100 view network 125. In other implementations, replacement application 112 and adoption client 114 are directly installed on client devices 105 (e.g., not via network 125).

Adoption client 114 may be executed on client device 105 (block 610). In some embodiments, adoption client 114 may be configured to automatically run upon startup of client device 105 or login of a particular user.

Adoption client 114 may detect execution of legacy application 110 (block 615). For example legacy application monitoring logic 305 may determine that legacy application 110 is running on client device 105. Next, it may be determined whether any adoption rules 405 are satisfied (block 615). For example, adoption rules logic 315 may compare rules 405 in adoption rules table 400 to corresponding timing parameters, keystrokes, commands, activities to determine whether any adoption rules 405 should be applied. For example, it may be determined whether legacy application 110 has just been opened, whether a predetermined amount of time has passed since a last reminder regarding replacement application 112 has been provided, whether a predetermined limit to legacy application execution time has been exceeded, etc.

If it is determined that no adoption rule has been satisfied, processing returns to block 615 for a next sampling interval. However, if one or more adoption rules 405 is satisfied, actions associated with the rules are executed (block 620). For example, if a time limit since a last reminder has lapsed, enforcement logic 320 may display a new reminder or notification regarding replacement application to the user of client device 105. In some implementations, the reminder may include a link to starting replacement application 112, etc.

Adoption client 114 may detect execution of replacement application 112 (block 625). For example replacement application monitoring logic 310 may determine that replacement application 112 is running on client device 105.

User interactions with replacement application 112 may be monitored (block 630). For example, replacement application monitoring logic 310 may detect interactions with replacement application 112, such as by monitoring receive keystrokes, user commands, etc. A user accuracy of interactions with replacement application 112 may be determined (block 635). For example, replacement application monitoring logic 310 may determine instances of mistakes (e.g., incorrect commands, improper usage of legacy commands or keystrokes, etc.), log or track any identified mistakes, and store the log for use in determining adoption rule satisfaction (e.g., for rules based on predefined error rates or accuracy levels).

It may be determined whether a received command or keystroke corresponds to a legacy application command (such as particular keyboard shortcuts associated with legacy application 110, etc.)(block 640). For example, replacement application monitoring logic 310 may compare received keystrokes or user commands with a table or database of known legacy application commands. In some implementations, the table or database of known legacy application commands includes information regarding corresponding comments in replacement application 112.

If it is determined that the received keystroke/command does not correspond to a known or recognized legacy application command (block 640—NO), processing may return to block 630 for a next monitoring interval or a next received user command or keystroke. However, if it is determined that the received keystroke/command does correspond to a known or recognized legacy application command (block 640—YES), adoption client 114 may display context-sensitive help to the user relating to the mistake (block 645). For example, replacement application monitoring logic 410 may retrieve help information corresponding to an identified mistake and may display the retrieved help information to the user.

In some implementations, the help information may be displayed in an interactive manner, thereby allowing the user to interact with the help information to view additional help information, tutorial information, or to perform action corresponding to the identified legacy command or keystroke. For example, assume that keystroke F1 in legacy application 110 corresponds to an "Enter Order" command, but that keystroke F1 in replacement application 110 does not corresponding to such a command. Consistent with implementations described herein, replacement application monitoring logic 310 may identify a user's erroneous use of the F1 command and may provide help information that enables the user to determine the proper interaction/command for attaining the desired result. Processing may return to block 630 for a next monitoring interval or a next received user command or keystroke.

Figure 7:
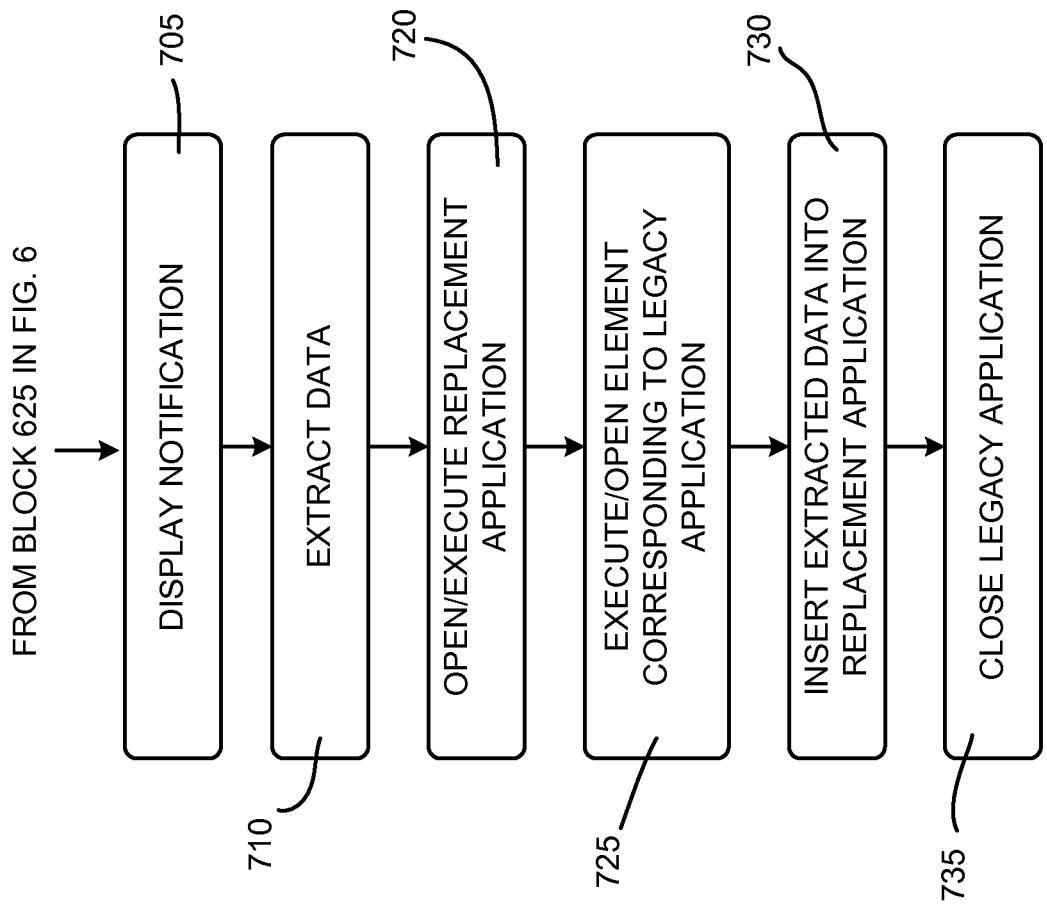
FIG. 7. is a flow diagram of exemplary processing for enforcing replacement application usage consistent with embodiments described herein.

As briefly described above, in some embodiments, adoption rules 405 may establish instances in which use of replacement application 112 is required and use of legacy application 110 is prevented. FIG. 7 is a flow diagram illustrating exemplary processing of block when such a rule is applied (e.g., a user has surpassed a predetermined length of time without executing replacement application 112).

When it is determined that a rule requiring use of replacement application 112 has been satisfied (block 615), adoption client 114 may display a notification regarding the required use of new application (block 705). As described above, in some instances, this determination may be made within a current usage session in legacy application 110. In order to maximize efficiency and minimize the amount of lost/redundant work, adoption client 114 may be configured to extract data from a current interface within legacy application 110, such as customer information, order information, input text data, etc. (block 710). For example, enforcement logic 320 may be configured to copy the data to a clipboard or other temporary storage on client device 105.

Next, adoption client 114 may be configured to open or initiate execution of replacement application 112 (block 720) and may cause execution of an element of replacement application 112 similar to the open element of legacy application 110 (block 725). For example, enforcement logic 320 may determine a current element (e.g., screen, process, flow, etc.) associated with legacy application 110. Enforcement logic 320 may then open or run a corresponding element in replacement application 112.

Adoption client 114 may insert the extracted data into corresponding portions of replacement application 112 (block 730). For example, enforcement logic 320 may retrieve the portions of extracted information from the storage in client device 105, and insert the information into corresponding fields within replacement application 112.

Adoption client 114 may then close legacy application 110 (block 735). By provided a mechanisms for translating or moving current information from legacy application 110 to replacement application 112 in accordance with adoption rules 405, maximum efficiency may be realized.

Consistent with implementations described herein, a new application adoption system may include a client entity (referred to as an adoption client) that monitors use of both the new application and the original, legacy application that the new application is replacing. User activity with respect to both the legacy application and the new, replacement application may be monitored and compared to a number of adoption rules. The adoption rules may dictate the user's adoption path by enforcing use of the replacement application at various times and in various circumstances, as defined by the adoption rules. For example, one or more adoption rules may dictate that use of the replacement application is forced in the event of various time periods expiring, accuracy rates, etc. In the event of a forced use scenario, data received by the legacy application may be automatically transitioned to the replacement application.

In addition to forced usage of the replacement application, in some implementations, adoption client may also provide contextual help within the replacement application by monitoring user interaction with the replacement application in view of commands and interactions associated with the legacy application.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of blocks have been described with respect to FIGS. 6 and 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   determining that a legacy application is executing on a client device;
   applying, when the legacy application is open in the client device, an adoption rule, wherein the adoption rule defines an instance in which a user is required to use a replacement application instead of the legacy application,
   wherein each of the legacy application and the replacement application are concurrently installed on the client device;
   determining that the adoption rule is satisfied;
   executing the replacement application when the adoption rule is satisfied;
   preventing, when the adoption rule is satisfied, use of the legacy application,
   determining that the replacement application is executing on the client device;
   identifying a user mistake relating to the replacement application, wherein the user mistake corresponds to a correct keystroke or user command in the legacy application; and
   automatically providing help to the user of the client device based on differences between the replacement application and the legacy application relating to the identified user mistake.

2. The method of claim 1, wherein determining that the legacy application is executing comprises:
   identifying open applications on the client device; and
   comparing the identified applications to the legacy application; and
   determining that the legacy application is open based on the comparison.

3. The method of claim 1, wherein determining that the adoption rule is satisfied comprises determining that a trigger associated with the adoption rule has occurred.

4. The method of claim 3, wherein the trigger comprises one or more of a time-based trigger, an activity-based trigger, or a statistics-based trigger.

5. The method of claim 3, wherein the trigger comprises a combination of at least two of a time-based trigger, an activity-based trigger, and a statistics-based trigger.

6. The method of claim 4, wherein the statistics-based trigger comprises an error rate, a mistake count, or an accuracy level.

7. The method of claim 4, wherein the time-based trigger comprises an amount of time that the replacement application has been used.

8. The method of claim 1, further comprising:
   extracting data from the legacy application when it is determined that the adoption rule is satisfied;
   inserting the extracted data into the replacement application; and
   closing the legacy application.

9. The method of claim 8, further comprising:
   determining a current element of the legacy application when it is determined that the adoption rule is satisfied; and
   inserting the extracted data into an element of the replacement application corresponding to the current element of the legacy application.

10. The method of claim 1, wherein the help comprises contextual text-based help, a tutorial, or an automated execution of a command or an instruction corresponding to the identified user mistake.

11. A system, comprising:
    a client device that concurrently stores each of a legacy application and a replacement application installed thereon; and
    an adoption client executing on the client device,
    wherein the adoption client is configured to:
        determine that the legacy application is executing on a client device;
        apply, when the legacy application is open in the client device, an adoption rule,
        wherein the adoption rule defines an instance in which a user is required to use a replacement application instead of the legacy application;
        determine that the adoption rule is satisfied;
        open the replacement application when the adoption rule is satisfied;
        prevent, when the adoption rule is satisfied, use of the legacy application:
        determine that the replacement application is executing on the client device;
        identify a user mistake relating to the replacement application, wherein the user mistake corresponds to a correct keystroke or user command in the legacy application; and
        automatically provide help to the user of the client device based on differences between the replacement application and the legacy application relating to the identified user mistake.

12. The system of claim 11, wherein the adoption client is further configured to determine that a trigger associated with the adoption rule has occurred, wherein the trigger comprises one or more of a time-based trigger, an activity-based trigger, or a statistics-based trigger.

13. The system of claim 12, wherein the trigger comprises a combination of at least two of a time-based trigger, an activity-based trigger, and a statistics-based trigger.

14. The system of claim 11, wherein the adoption client is further configured to:
    extract data from the legacy application when it is determined that the adoption rule is satisfied;
    insert the extracted data into the replacement application; and
    close the legacy application.

15. The system of claim 11, further comprising:
    an application update server connected to the client device via a network;
    wherein the application update server is configured to:
        distribute the replacement application to the client device;
        distribute the adoption client to the client device; and transmit a number of adoption rules to the adoption client.

16. The system of claim 15, wherein the application update server is configured to periodically transmit updated versions of the adoption client to the client device.

17. The system of claim 15, wherein the adoption client is configured to:
   compile user statistics for usage time and error rates or mistake counts; and
   transmit the user statistics to the application update server.

18. system of claim 17, wherein the application update server is configured to:
   generate updated adoption rules based on the user statistics; and
   transmit the updated adoption rules to the adoption client.

19. A non-transitory computer-readable medium having stored thereon sequences of instructions which, when executed by at least one processor, cause the at least one processor to:
   determine that a legacy application is executing on a client device;
   apply, when the legacy application is open in the client device, an adoption rule, wherein the adoption rule defines an instance in which a user is required to use a replacement application instead of the legacy application,
   wherein each of the legacy application and the replacement application are concurrently installed on the client device;
   determine that the adoption rule is satisfied;
   execute the replacement application when the adoption rule is satisfied;
   prevent, when the adoption rule is satisfied, use of the legacy application;
   determine that the replacement application is executing on the client device;
   identify a user mistake relating to the replacement application, wherein the user mistake corresponds to a correct keystroke or user command in the legacy application; and
   automatically provide help to the user of the client device based on differences between the replacement application and the legacy application relating to the identified user mistake.

* * * * *